United States Patent
Rajappa et al.

(10) Patent No.: US 9,588,823 B2
(45) Date of Patent: Mar. 7, 2017

(54) ADJUSTMENT OF EXECUTION OF TASKS

(71) Applicant: Intel Corporation, Santa Clara, CA (US)

(72) Inventors: Muralidhar Rajappa, Chandler, AZ (US); Andy Hoffman, Olympia, WA (US); Devadatta V. Bodas, Federal Way, WA (US); Justin J. Song, Olympia, WA (US); James W. Alexander, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/582,979

(22) Filed: Dec. 24, 2014

(65) Prior Publication Data

US 2016/0188379 A1   Jun. 30, 2016

(51) Int. Cl.
G06F 15/80 (2006.01)
G06F 9/52 (2006.01)

(52) U.S. Cl.
CPC ..................... G06F 9/52 (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| 7,210,048 | B2 | 4/2007 | Bodas |
| 7,421,623 | B2 | 9/2008 | Haugh |
| 7,724,149 | B2 | 5/2010 | Kettler, III et al. |
| 8,631,411 | B1 | 1/2014 | Ghose |
| 2005/0278520 | A1 | 12/2005 | Hirai et al. |
| 2006/0107262 | A1 | 5/2006 | Bodas et al. |
| 2006/0241880 | A1 | 10/2006 | Forth et al. |
| 2008/0172398 | A1 | 7/2008 | Borkenhagen et al. |
| 2008/0301479 | A1 | 12/2008 | Wood |
| 2009/0037926 | A1* | 2/2009 | Dinda ................... G06F 9/4887 718/107 |
| 2009/0049313 | A1 | 2/2009 | Gooding et al. |
| 2009/0070611 | A1 | 3/2009 | Bower et al. |
| 2009/0100437 | A1 | 4/2009 | Coskun et al. |
| 2009/0144566 | A1* | 6/2009 | Bletsch ................. G06F 1/3203 713/300 |
| 2009/0235097 | A1 | 9/2009 | Hamilton et al. |
| 2010/0094475 | A1 | 4/2010 | Masters et al. |
| 2011/0010717 | A1 | 1/2011 | Yamaoka et al. |

(Continued)

OTHER PUBLICATIONS

Nicolau et al., Techniques for Efficient Placement of Synchronization Primitives, 2009.*

(Continued)

Primary Examiner — H S Sough
Assistant Examiner — Zhan Chen
(74) Attorney, Agent, or Firm — International IP Law Group, P.L.L.C.

(57) ABSTRACT

A system and method for distributed computing, including executing a job of distributed computing on compute nodes. The speed of parallel tasks of the job executing on the compute nodes are adjusted to increase performance of the job or to lower power consumption of the job, or both, wherein the adjusting is based on imbalances of respective speeds of the parallel tasks.

25 Claims, 8 Drawing Sheets

(56) References Cited

U.S. PATENT DOCUMENTS

| | | | |
|---|---|---|---|
| 2011/0072505 A1* | 3/2011 | Ott | G06F 8/61 726/11 |
| 2011/0138395 A1 | 6/2011 | Wolfe | |
| 2011/0154348 A1* | 6/2011 | Elnozahy | G06F 1/324 718/104 |
| 2011/0185364 A1* | 7/2011 | Fernandes | G06F 9/5083 718/104 |
| 2011/0231860 A1 | 9/2011 | Kazama et al. | |
| 2012/0030493 A1 | 2/2012 | Cepulis et al. | |
| 2012/0072389 A1 | 3/2012 | Aldridge et al. | |
| 2012/0109705 A1 | 5/2012 | Belady et al. | |
| 2013/0042118 A1* | 2/2013 | Robben | G06F 1/3206 713/300 |
| 2013/0054987 A1 | 2/2013 | Pfeiffer et al. | |
| 2013/0086404 A1 | 4/2013 | Sankar et al. | |
| 2013/0205092 A1* | 8/2013 | Roy | G06F 12/084 711/130 |
| 2014/0189301 A1 | 7/2014 | Gorbatov et al. | |
| 2014/0215487 A1* | 7/2014 | Cherkasova | G06F 9/5083 718/106 |
| 2014/0281647 A1 | 9/2014 | Bodas et al. | |
| 2014/0298047 A1 | 10/2014 | Holler et al. | |

OTHER PUBLICATIONS

International Search Report, PCT No. PCT/US2015/054438, mailed on Jan. 22, 2016, 4 pages.
International Search Report, PCT No. PCT/US2015/054440, mailed on Jan. 22, 2016, 6 pages.
Bodas, et al., "Simple Power-Aware Scheduler to Limit Power Consumption by HPC System Within a Budget", U.S. Appl. No. 62/040,576, filed Aug. 22, 2014.

* cited by examiner

100

200

500

ADJUSTMENT OF EXECUTION OF TASKS

CROSS-REFERENCE TO RELATED APPLICATIONS

The present application is related to the U.S. patent application Ser. No. 14/582,795 entitled "Methods and Apparatus to Estimate Power Performance of a Job that Runs on Multiple Nodes of a Distributed Computing System" filed Dec. 24, 2014; the U.S. patent application Ser. No. 14/582,783 entitled "Method and Apparatus to Generate and Use Power, Thermal and Performance Characteristics of Nodes to Improve Energy Efficiency and Reducing Wait Time for Jobs In the Queue" filed Dec. 24, 2014; the U.S. patent application Ser. No. 14/582,772 entitled "Methods and Apparatus to Manage Jobs that can and Cannot be Suspended when there is a Change in Power Allocation to a Distributed Computer System" filed Dec. 24, 2014; the U.S. patent application Ser. No. 14/582,743 entitled "Managing Power Performance of Distributed Computing Systems" filed Dec. 24, 2014; the U.S. patent application Ser. No. 14/582,756 entitled "Profiling of Job Power and Energy Consumption for a Data Processing System" filed Dec. 24, 2014; the U.S. patent application Ser. No. 14/582,764 entitled "Power Aware Job Scheduler and Manager for a Data Processing System" filed Dec. 24, 2014; the U.S. patent application Ser. No. 14/582,985 entitled "Control of Power Consumption" filed Dec. 24, 2014; and the U.S. patent application Ser. No. 14/582,988 entitled "Forecast for Demand of Energy" filed Dec. 24, 2014.

TECHNICAL FIELD

The present techniques relate generally to adjustment of execution of tasks of a distributed computing job and, more particularly, to adjustment of execution of such tasks based on imbalances among the tasks.

BACKGROUND ART

High Performance Computing (HPC) and distributed computing may facilitate scientists and engineers to solve complex science, engineering, and business problems using applications that benefit from high bandwidth, low latency networking, and very high compute capabilities. Such HPC systems may also execute data storage and retrieval, perform more straightforward tasks, and so on. Unfortunately, HPC systems, which generally have thousands of compute nodes performing tasks, typically consume significant power. Such may be especially problematic in the "Big Data" era. Further, variations in power consumption and issues of power allocation may also be problematic.

The competitive business of data and computing services drives manufacturers in the continuous improvement of their processes and products in order to lower production costs and deliver reliable service. Indeed, as technologies advance in services for data, computing, and telecommunications, a competitive need exists to continuously increase consistency of service and the efficiency of power utilization.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
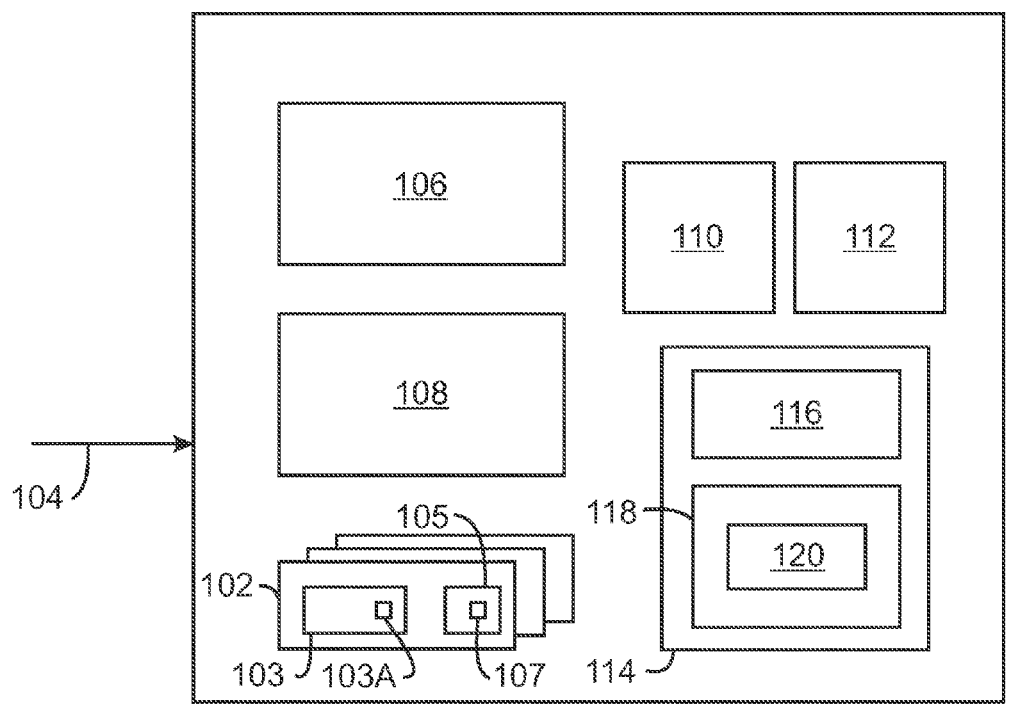
FIG. 1 is a diagrammatical representation of an exemplary distributed computing facility in accordance with embodiments of the present techniques.

Embodiments of the present techniques are directed to distributed computing, datacenters, super computers, high performance computing (HPC), telecommunication centers, cloud computing, Big Data analytics, and the like. As mentioned below, aspects may be applicable to phones, laptops, desktop computers, and so on. As discussed below, embodiments increase performance and lower power for distributed computing systems by selective and dynamic adjustment of power performance between multiple cooperative tasks of a distributed computing or HPC job executing on compute nodes.

The adjustment of the tasks may be with respect to the speed or time-to-completion of the tasks and, thus, affect the power and/or performance of the HPC job. To adjust the speed of a task, the frequency (and therefore the power consumed) of the processor core on which the task is executing may be adjusted. For instance, the operating frequency of the processor core may be increased to increase speed of the task. On the other hand, the operating frequency of the processor core may be decreased to decrease speed of the task.

Embodiments include adjustment of execution of distributing computing tasks based on speed and power imbalances among the tasks, and to decrease power consumption and/or increase job performance. Embodiments to decrease power performance may identify and slow the faster tasks (ranks). Embodiments to increase job performance may identify and accelerate the slowest task (rank). The identification of the faster tasks, or of the slower tasks or slowest task, may be predictive using heuristics based on past and current performance, based on node memory activity including quantity of accesses and instructions, for example, and so forth.

In operation, the work of an HPC job may be divided into a large number of smaller parallel tasks or threads. For instance, a workload manager or job manager divides the job into tasks and assigns tasks to compute nodes, e.g., a set of available processor cores or threads. These tasks, typically referred to as ranks, perform small work and then communicate to synchronize within all tasks or groups of tasks, to determine the next steps for the tasks. The tasks resume further work after the tasks are synchronized.

Thus, the tasks execute to arrive at a common synchronization point. Unfortunately, performance, e.g., measured as time-to completion, of the entire job may be dictated by the task that synchronizes last. There may be at least two sources for wastage of energy. First, the tasks that hurried up, completed early and waiting for synchronization, wasted energy in hurry-up or operating faster (at high frequency). Second, even after completion while waiting, energy consumed by the completed tasks is non-zero and is a waste. While processor cores may be placed in a low power state while waiting, still power is expended without execution.

Sources of imbalances of the tasks may include differences in computation between tasks, such as with different datasets and/or different code paths, pipelined or non-pipelined, serial or parallel, and so forth. Sources of imbalances may be due to the operating system (OS) and other services, as well as manufacturing variations (see, e.g., FIG. 6) especially when a processor is operated with a power or thermal limit. Some parts may reach the limit and will be throttled, while others may not reach the limit and operate at a higher speed.

Beneficially, as discussed below with respect to the figures, embodiments herein may: (1) lower the power consumed while completing an HPC job within the same time; and/or (2) improve performance (measured as time-to completion) of an HPC job while consuming the either same power or slightly higher power. In most or all of the cases, total energy may be saved. As can be appreciated, energy equals power multiplied by time.

Figure 3:
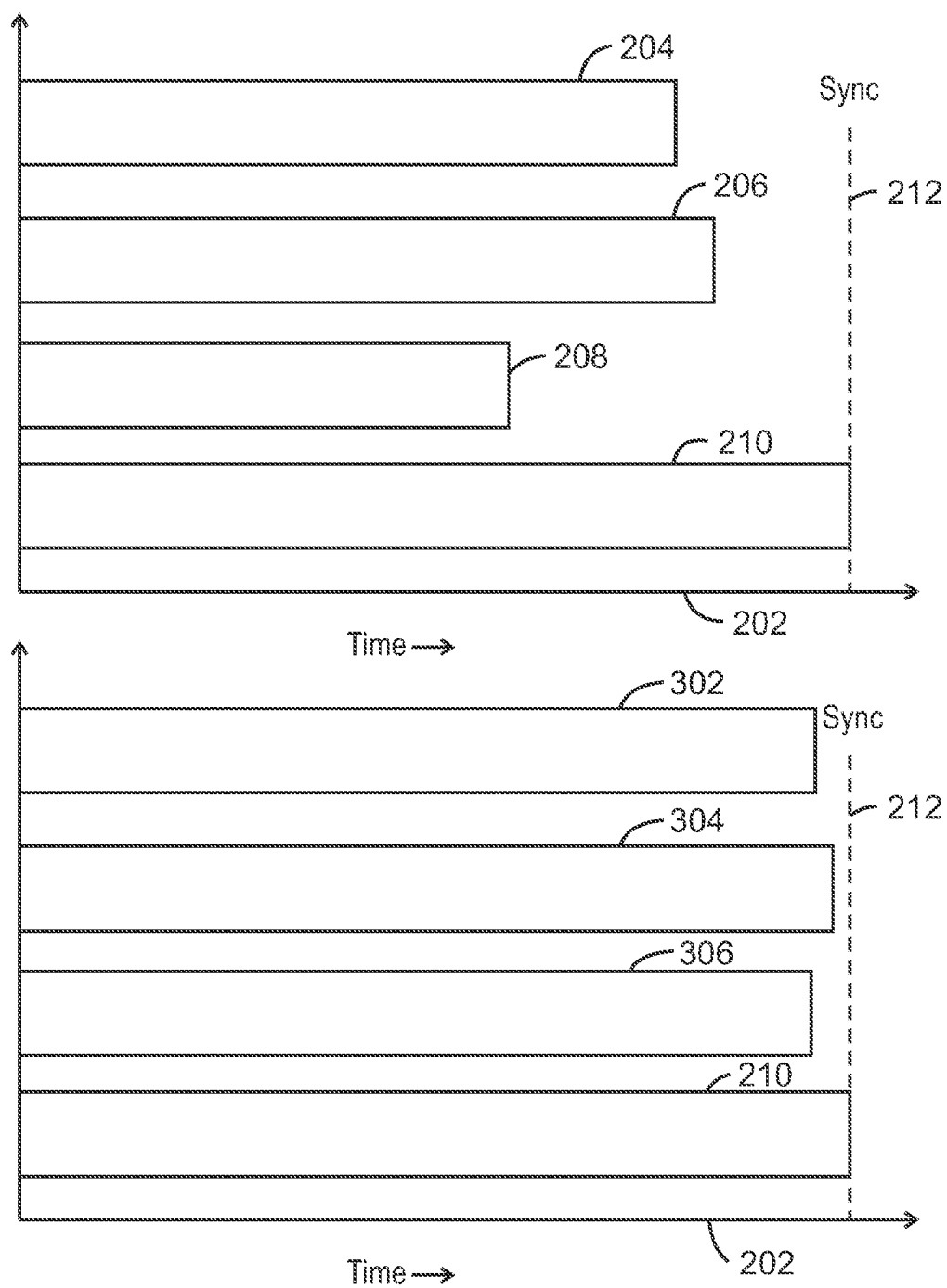
FIG. 3 is a bar chart over time of the exemplary HPC job of FIG. 2, with the additional depiction of adjustment of the parallel tasks to lower power consumption of the HPC job in accordance with embodiments of the present techniques.

With respect to (1), implementations may lower the power consumed by slowing down tasks that execute fastest and are ready for synchronization soonest before other tasks (see, e.g., FIG. 3). This saves power while preserving performance. With respect to (2), implementations may improve performance by slowing the fast tasks by some amount, thus saving some power, and the saved power used to run the slow tasks faster (see, e.g., FIG. 4). This may improve performance while consuming the same or similar amount of the power. In another implementation of (2), if there is power or thermal headroom, speed of the slower task may be increased (e.g., to maximum speed) to achieve the highest improvement in performance using the headroom.

Note that combination of both power and performance improvements may be implemented by particular adjustments with respect to the amounts of slowing the fast tasks and increasing speed of the slow tasks. In all, energy may be saved. In contrast to conventional HPC systems, embodiments herein use imbalances at task/rank levels to improve job energy efficiency or power profile as disclosed herein. Moreover, in addition to or in lieu of predictive adjustments, reactive adjustments (see, e.g., FIG. 5) to task execution may be employed, as discussed below.

FIG. 1 is a diagrammatical representation of a distributed computing facility 100 such as a HPC facility, Big Data analytics facility, datacenter, telecommunications center, and so on. The depiction of the computing facility 100 may represent a single facility or multiple facilities across geographical locations. In the illustrated embodiment, the distributed computing facility 100 has nodes 102. In examples, the number of nodes 102 may be as many as 16, 2,000, 5,000, 10,000, 20,000, 40,000, 60,000, 100,000, 1,000,000, or greater. In certain embodiments, the nodes 102 may generally be compute nodes and also include one or more operating system (OS) nodes, for example.

Each node 102 typically includes one or more processors 103, such as a central processing unit (CPU). Indeed, each node 102 may have a CPU processor package including multiple processors 103. Further, each processor 103 has one or more processing cores 103A. For example, a processor 103 may have ten cores 103A. In addition, each node 102 may have memory 105 storing code 107 (i.e., logic, modules, instructions, etc.) executable by the processor 103 or other processor. The code 107 may include a node manager, job manager, and the like, to facilitate execution of tasks and adjustment of the tasks with respect to power and performance. The nodes 102 may include other hardware, software, and firmware, may be housed in racks, for example, and may be grouped into systems or groups of nodes 102, and so forth.

The facility 100 receives power, as indicated by reference numeral 104. The power may be electricity received from one or more electricity providers such as a utility company. As can be appreciated, the compute nodes 102 and other computing devices in the facility 100 generally require power or electricity as electronic devices in computing and executing tasks. Further, other systems such as lighting and cooling systems, represented by blocks 106 and 108, respectively, may consume power. Moreover, in certain embodiments, the facility 100 may include alternate or local power generation systems 110 (e.g., diesel generators, etc.) and/or battery or power storage systems 112.

In addition, the facility 100 generally includes one or more computing devices 114 (e.g., servers) which may be disposed locally within the facility 100 and/or remote to the facility 100. The computing device(s) 114 may include one or more processors 116 (e.g., CPU) and memory 118. Various manager modules or code 120 may be stored in the memory 118 and executable by the processor(s) 116. For example, the executable code 120 and/or the aforementioned executable code 107 on the nodes 102 may include a job manager that may assign and manage tasks across the compute nodes 102, including with respect to power consumption. Other examples of manager modules in the server executable code 120 and/or in the node executable code 107 include a facility power manager, resource manager, system managers (e.g., for groups of nodes), rack managers, node managers, and so on. Moreover, a compute node can be a server or a board, and/or several compute nodes may be on one board.

Figure 2:
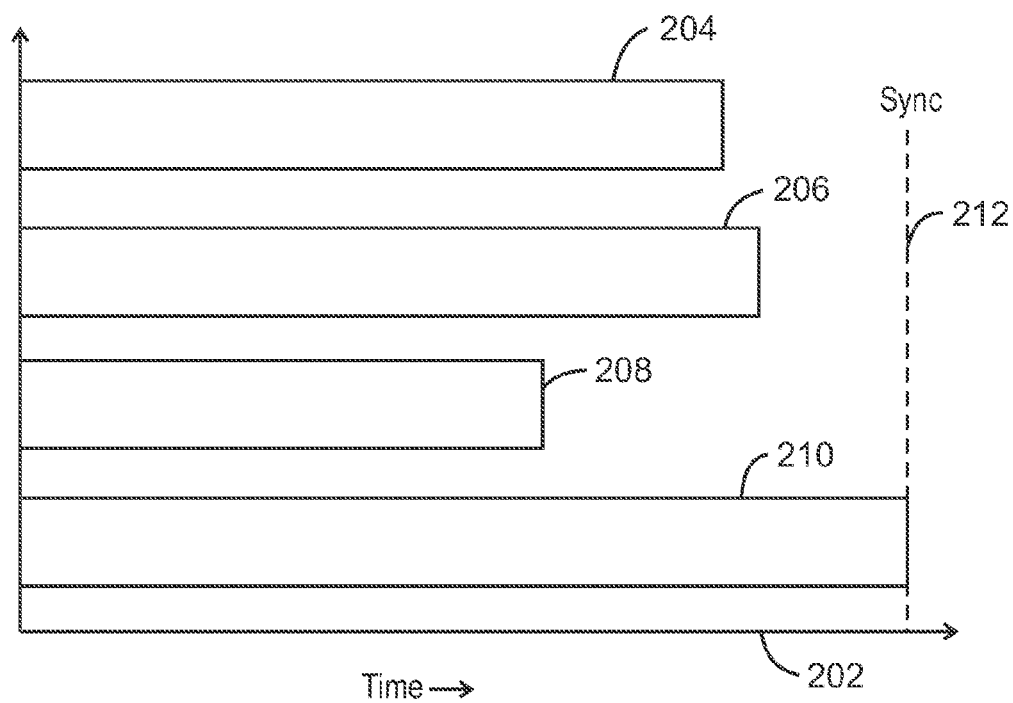
FIG. 2 is a bar chart of an exemplary HPC job having parallel tasks over time.

FIG. 2 is a bar chart 200 of an example distributed computing job (e.g., HPC job, Big Data analytics job, etc.) having parallel tasks over time 202. While HPC jobs or Big Data analytics jobs typically have numerous (e.g., thousands of) parallel tasks, the bar chart 200 depicts a job with only four parallel tasks 204, 206, 208, 210 for simplicity. As can be appreciated, a distributed computing job may typically have hundreds or thousands of parallel tasks.

Thus, an HPC job may be implemented in parallel tasks. For example, a job manager (e.g., code 107, 120 as executed) residing on the nodes and/or server distributes the job into tasks across compute nodes 102. These tasks 204, 206, 208, 210 execute and communicate to synchronize within all tasks or groups of tasks, to determine the next steps for tasks. Further additional tasks of the job resume further executions after the depicted tasks 204, 206, 208, 210 are synchronized. Synchronization can be between two tasks, group of tasks or all tasks in a job.

Thus, the tasks 204, 206, 208, 210 execute to arrive at a common synchronization point 212 in time. As also mentioned, performance (e.g., measured as time-to completion) of the HPC job may be dictated by the task 210 that synchronizes last. Thus, power may be wasted by tasks 204, 206, 208 that are polling or waiting to synchronize, i.e., having to wait for the slowest task 210 to complete.

Sources of imbalances in completion time among the tasks 204, 206, 208, 210 may be because of differences in computation between the tasks. Such differences in computation may be due to different datasets, different code paths, and whether the respective task execution is pipelined or non-pipelined, serial or parallel, and so on. Further, sources of imbalances may be related to the operating system (OS) and other services, as well as to manufacturing variations such as those involving differences in experiencing power or thermal limits. As discussed below, some parts may reach limits and be throttled, others may not reach limits.

FIG. 3 is a bar chart 300 over time 202 depicting for comparison the four tasks 204, 206, 208, 210 as executed in FIG. 2. The bar chart 300 further depicts three of these four tasks as adjusted in an example implementation of their execution to lower energy and power consumption of the distributed computing job (e.g., HPC job, Big Data analytics job, etc.) in accordance with embodiments of the present techniques.

In the illustrated embodiment, the three parallel tasks 204, 206, 208 that execute faster and are ready for synchronization sooner are slowed. These three tasks 204, 206, 208, as adjusted (slowed), are denoted by reference numerals 302, 304, and 306, respectively. Thus, the three adjusted tasks 302, 304, 306 are the tasks 204, 206, 208 extended in execution time to lower power consumption of task execution. Power may be saved for such adjusted tasks 302, 304, 306 as they are operated at lower speed or lower frequency than before. Lower frequency operates at lower voltage. Consequently, the tasks 302, 304, 306 will complete the same computation consuming less energy and, therefore, are more energy efficient. Thus, examples of increasing the time of execution of an HPC task by reducing frequency of the processor(s) executing the task may save significant power. Of course, other aspects of power relationships with the components are applicable. Moreover, as indicated, a job will typically have hundreds or thousands of parallel tasks, and adjustments to speeds of the tasks may generally involve adjusting speed of hundreds or thousands of tasks, or adjusting speed of groups of tasks. Likewise, the frequency of hundreds or thousands of processors or processor cores, or groups of processors or processor cores, may be adjusted.

Figure 4:
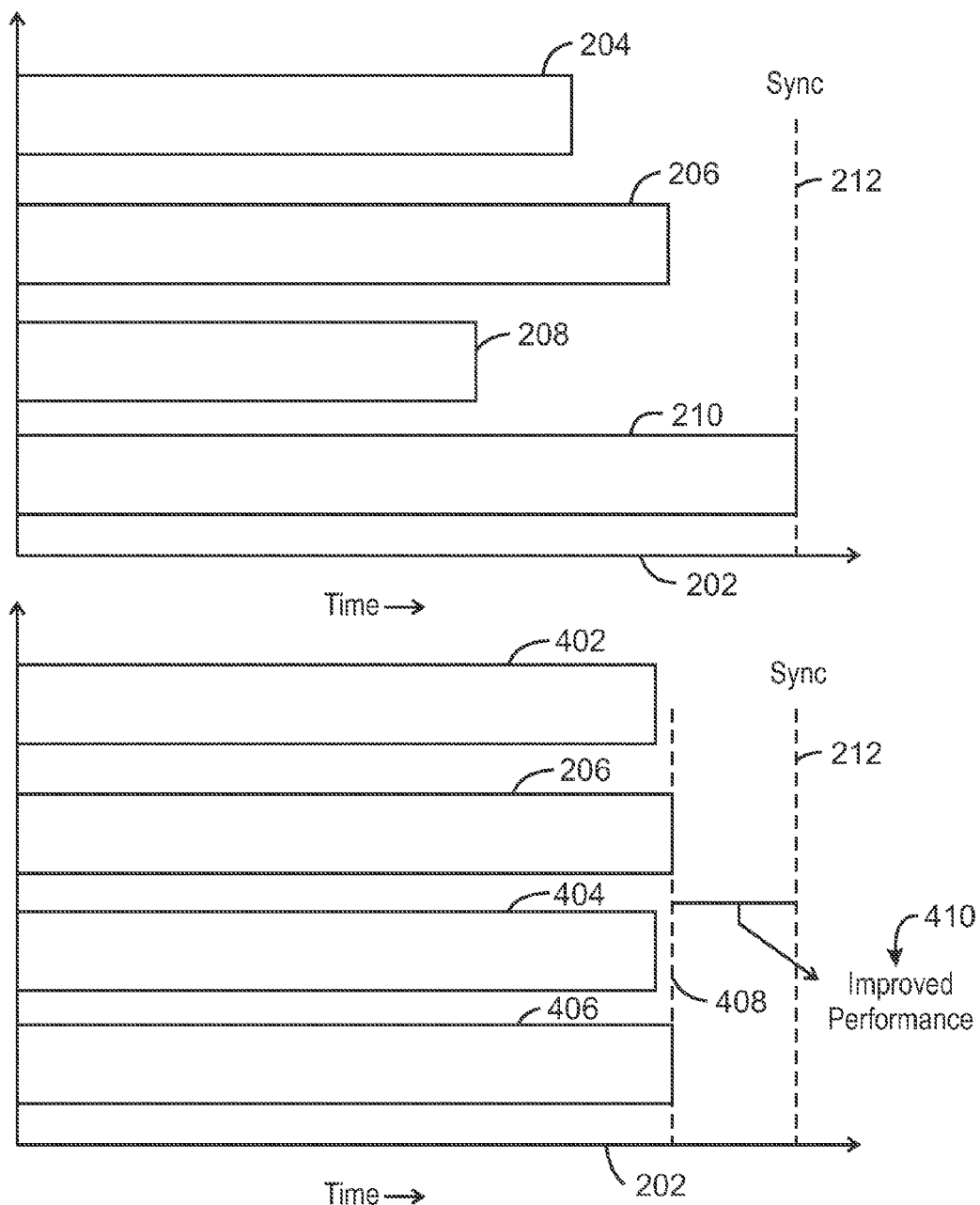
FIG. 4 is a bar chart over time of the exemplary HPC job of FIG. 2, with the additional depiction of adjustment of the parallel tasks to increase performance, e.g., measured as time to completion, of the HPC job in accordance with embodiments of the present techniques.

FIG. 4 is a bar chart 400 depicting an example of adjusting task execution to increase performance (e.g., as measured by time to completion) of the distributed computing or HPC job (or Big Data analytics job). For instance, faster tasks may be slowed, and the energy saved used to run the slower tasks faster (e.g., at higher frequency of the associated node processor core), speeding the slower tasks. Thus, the synchronization point moves to earlier in time, and therefore, increasing performance of the HPC job. In particular examples of such increased performance, the same or similar power consumption of the HPC job maintained and the total power consumed by the HPC job may remain approximately the same.

In another embodiment with more power headroom available, a slower task is made faster without slowing down the faster tasks. In such cases, power consumption may increase. However, because time-to-complete a job is reduced, the total energy consumption by the job may be reduced.

For the particular illustrated example of FIG. 4, the bar chart 400 depicts over time 202 the four tasks 204, 206, 208, 210 for comparison as executed in FIG. 2. In this example, faster tasks 204 and 208 may be slowed, as denoted by reference numerals 402 and 404, respectively. By slowing such fast tasks, some energy is saved. This saved energy may be used to run the slowest task 210 faster (e.g., at higher frequency of the associated processor core 103A), as denoted by reference numeral 406. In this example, execution of the task 206 is unaffected. In all, the synchronization point 212 is moved to earlier in time, as indicated by reference numeral 408, giving an improved performance 410 of the HPC job or Big Data analytics job.

Examples employing reactive mode are now noted. In reactive mode, when one task finishes, speed of many or all other tasks is increased. In a particular embodiment, the speed increase applied is equal per task. In another embodiment, the speed increase is correlative with the reduction power associated with the first task completing. In yet another embodiment, the increase in speed applied to the other tasks is unequal per task. In this unequal technique, a heuristic may be used to rank-order remaining tasks and whichever one is predicted to be slowest may the task that gets accelerated or accelerated more.

In certain examples, the Big Data system or HPC system (having a group of compute nodes 102) may execute under a power limit. If so, most or all tasks, including the slowest, may be subjected to a power limit and therefore execute at lower than maximum possible frequency. As indicated, by slowing down the fastest tasks (e.g., 204 and 206) by an appropriate or specified amount, some energy is saved, and that saved energy or other energy may be used to speed (e.g., increase frequency of the node processor core on which the task is executing) the slowest task(s) (e.g., 210). Consequently, while the power limit may be matched, the tasks reach an earlier synchronization point (e.g., 408), increasing job performance. With or without such a power limit, in examples such as with available processor frequency increase, slowing fast task(s) to save power may be used to speed-up the slow task(s) to increase job performance while maintaining the same or similar, power consumption of the job.

Various techniques for task speed control may be employed. For example, a predictive approach involving heuristics analysis of past and current tasks' timing data to predict which task(s) will run slow or fast in the future. In other examples, a reactive approach may involve accelerating tasks when one or more of the other tasks are ready for synchronization. To determine and control speed of tasks, a combination of predictive and reactive techniques may be employed, as well as other approaches.

Figure 5:
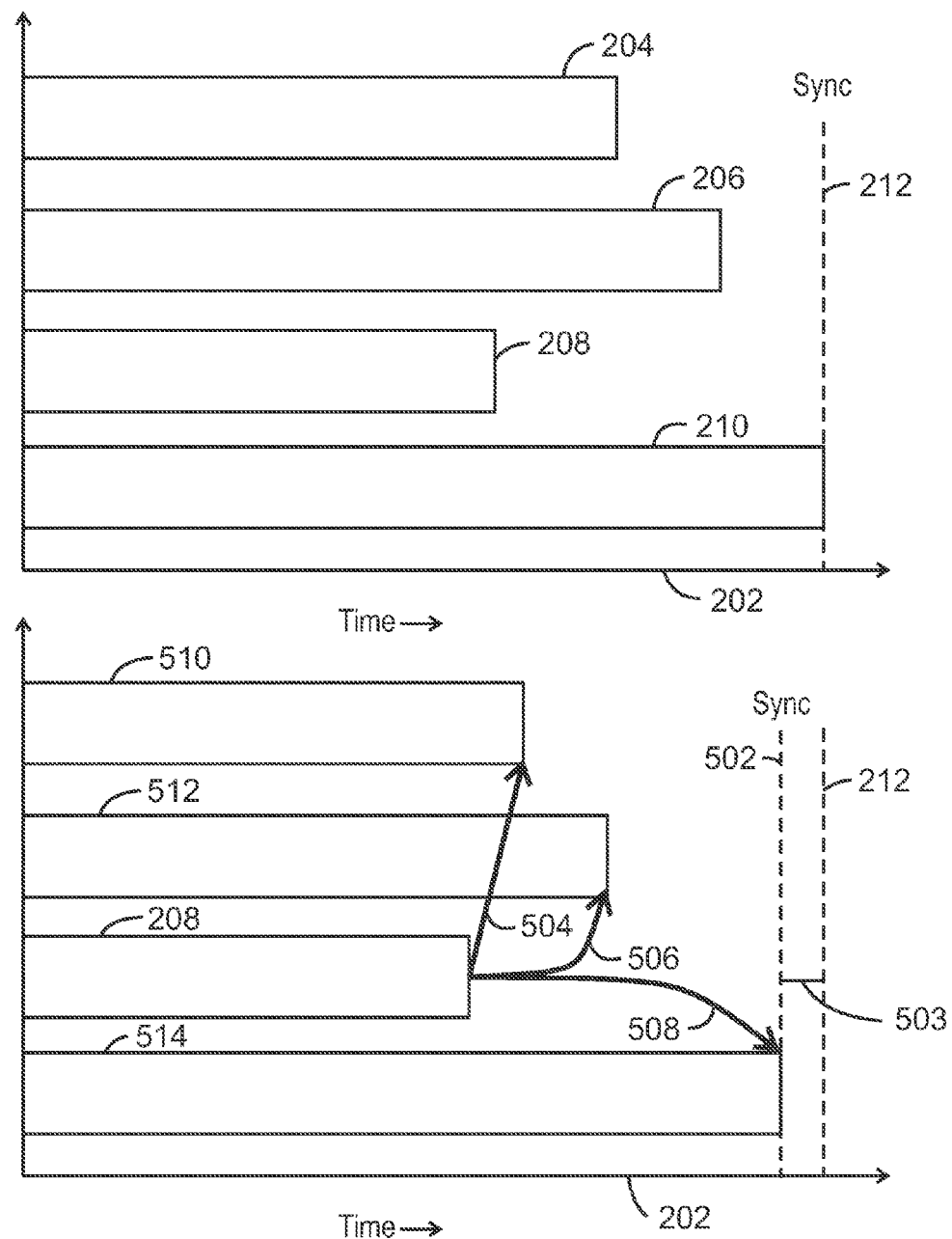
FIG. 5 is a bar chart over time depicting an example of adjusting task execution reactively to increase performance in accordance with embodiments of the present techniques.

FIG. 5 is a bar chart 500 depicting an example of adjusting task execution reactively to increase performance (e.g., as measured by time-to-completion) of the distributed computing or HPC job (or Big Data analytics job). It should be noted that aspects of reactive adjustments may be applicable to task execution on phones, laptops, desktop computers, and so on.

For comparison, the bar chart 500 depicts over time 202 the four tasks 204, 206, 208, 210 as executed in FIG. 2. In this illustrated example of reactive adjustment giving performance increase, the increase in job performance is noted by movement of the synchronization point 212 to the new synchronization point 502 earlier in time. The adjustment action may be reactive in a sense that adjustments to tasks 204, 206, 210 are made in response to completion of the fastest task 208.

In FIG. 5, the reactive adjustments of tasks 204, 206, 210 in response to completion of the fastest task 208 are denoted by reactive adjustment arrows 504, 506, and 508, respectively, giving adjusted tasks 510, 512, 514. In examples, again, the reactive adjustment to increase the speed of the tasks 204, 206, 210 is to increase job performance by moving the synchronization point 212 to synchronization point 402 earlier in time. In the particular illustrated example, the task 208 is unaffected. After all, for this reactive adjustment scenario, the adjustments are decided and occur upon completion of the original task 208. It should be noted that reactive adjustments can apply in computing systems (e.g., personal computers, laptops, etc.) other than distributed computing systems.

Further, the adjustment of tasks may be a combination of reactive and predictive. In one example, the adjustment is reactive in that the adjustment is initiated upon completion or in response to completion of the fastest task 208. The adjustment may then be predictive in that the task 210 that is slowest is predicted (e.g., via measurement of memory activity) as the slowest and, therefore, is accelerated. The other remaining tasks 204 and 206 may be unaffected or may be slowed, for example, unlike in FIG. 5 where those tasks 204 and 206 are accelerated. Accelerating tasks 204 and 206 will result in completion of tasks 204 and 206 faster. So when task 204 is completed by reactive mechanism, tasks 206 and 210 will be accelerated. and so on. Of course, a variety of other combinations of reactive and predictive adjustments may be accommodated.

It should be noted that the adjustment action may be predictive in a sense that determinations, such as via heuristic based upon measurements of time each task was waiting for synchronization in earlier time periods, can indicate that task 208 will be the fastest task, and then adjustments made to execution of the remaining tasks 204, 206, 210 upon such a prediction. This information may be used to decide when task 208 completes. Based upon the information, a reactive technique will decide if and how much tasks 204, 206, 210 will be speed up. Further, there may be additional aspects to predictions and adjustments. For instance, the adjustments could consider power aspect. In other words, the amount of power can be calculated when the faster task(s) stops consuming power. Increase in speed of slower tasks may be implemented in such a way so that overall increase in power consumption by speeding slow tasks is less than or equal to drop in power reduction due to completion or pause in the fastest task.

Figure 6:
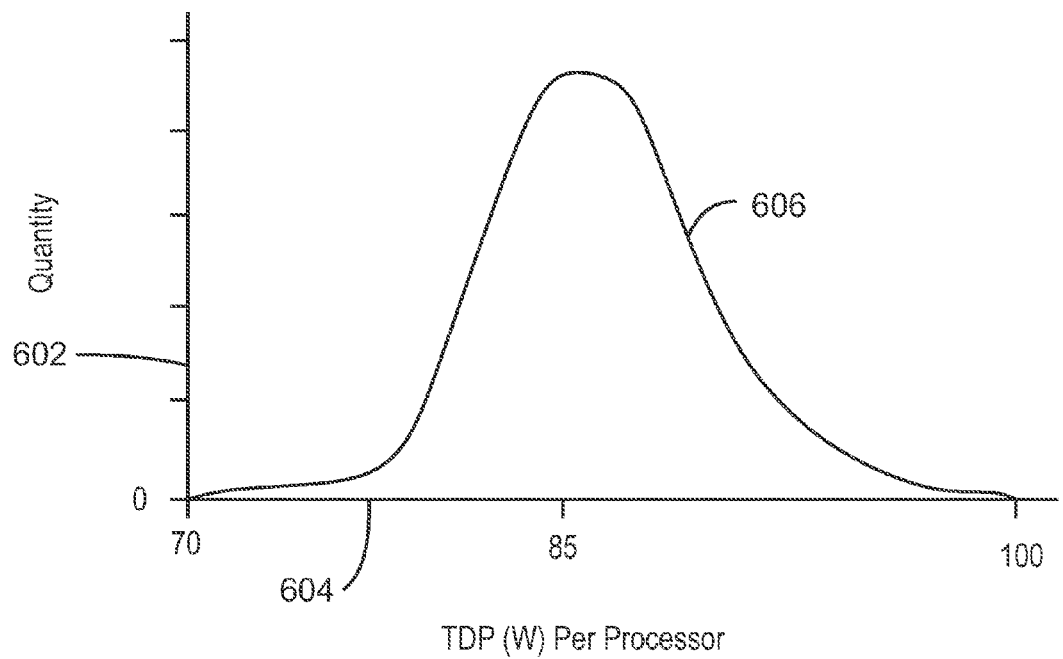
FIG. 6 is a representative exemplary distribution plot of quantity of processors (of a distributed computing system) versus actual thermal design power (TDP) per processor.

FIG. 6 is a representative exemplary distribution plot 600 of quantity of processors 602 (of a distributed computing system, e.g., at facility 100) versus actual thermal design power (TDP) per processor 604. A TDP is a processor specification that provides guidance on amount of power delivery and cooling a processor needs. FIG. 6 shows an example of actual TDP for each processor having the same model number. A rational approach suggests that the TDP specified for these processor with that model number be set at 100 W (which is approximately the maximum actual power of the distribution of processors), so that power delivery and cooling solution designed for 100 W will work will all processors in that distribution.

The distribution curve 606 of FIG. 6 is given as a representative example to note that processors (e.g., processors 103 of compute nodes 102) with the same manufacturer specifications and operating at the same frequency, vary in actual TDP by as much as 20% or 30%, and greater. Actual worst case power consumption governed by electrical and chemical component composition by each processor varies as shown in FIG. 6. For example, a manufacturer may choose to market all processor with actual TDP of 70-100 W as 100 W (TDP) processors. A system designed to incorporate 100 W TDP processor may accommodate such variation, but with the processors specified as 100 W TDP processors. Various techniques such as Running Average Power Limit (RAPL) are employed to limit processor power below user defined limits. Controls on processors actively monitor power consumed by processor and may reduce processor frequency to maintain processor power consumption below the RAPL limit. When processors are forced to operate within a power limit, this variation of actual power can result in variation in speed of operation, such as with nodes using the processors with variation 606. As an example, all the processors on the nodes are subjected to a power limit of 85 W. In such a case, processors that have actual TDP over 85 W will be throttled or slowed in order to ensure their power consumption will not exceed 85 W. The amount of slowdown will depend upon power difference between 85 W and actual TDP (in the range of 85 W to 100 W) of each processor with actual TDP over 85 W. As for the remaining processors, which have actual TDP at or below 85 W, these processor will not slow down and generally operate at full frequency and, thus, increasing speed of task executing thereon. This difference in speed between the slower tasks (executing on processors with actual TDP greater than 85 W) versus the faster tasks (executing on processors with actual TDP less than 85 W), will result in variation in time of completion of tasks on the distribution of processors.

In the illustrated embodiment, the listed values of 70 W, 85 W, and 100 W for actual TDP per processor 604 are arbitrary and for illustration purposes. A purpose is to explain that the actual TDP per processor 604 can vary (due to manufacturer variations of the components of the processor) by as much as 10%, 20%, 30%, etc., for processors having the same model number and operating at the same frequency.

In a hypothetical example, for a processor that is marked or specified for a TDP of 100 W, for instance, the actual TDP of the processor or processor parts could be between 70 W to 100 W or in other ranges. That set 100 W of TDP may be specified, for example, so that when a customer or user designs their power delivery and cooling solution for 100 W, such generally covers power and heat variations. However, if a power limit of 85 W is set or specified, for instance, processors or processor parts with actual TDP between 85 W to 100 W will typically throttle while processors or processor parts with actual TDP between 70 to 85 may beneficially be operationally adjusted to operate an increased (e.g., turbo) frequency, for instance. That is, applying equal power limit to processors and processor parts can result in significant variations in operational frequency.

In an example, when processors that may have TDP variation between 80 to 100 W, for example, and each are specified with the TDP limit of 90 W, such would demonstrate varying performance. Moreover, the processors that have actual TDP lower than 90 W may not have may impact on performance while processor closer to actual TDP of 100 W may experience significant degradation in performance. In certain instances, although most or all processors in HPC system have the same model numbers and identical specified power limit, variation in performance generally occurs.

Figure 7:
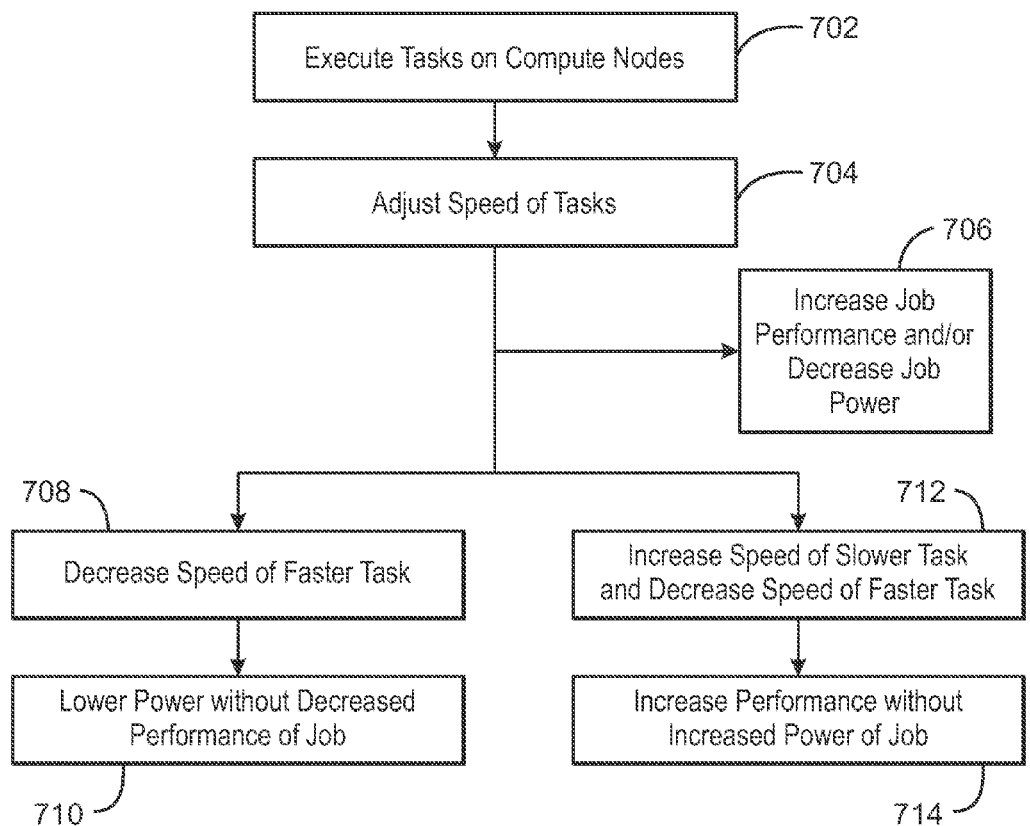
FIG. 7 is a block flow diagram of a method of executing a distributed computing job in accordance with embodiments of the present techniques.

FIG. 7 is a method 700 of executing a distributed computing job (e.g., an HPC job or Big Data analytics job). The method includes executing (block 702) parallel tasks of the job on compute nodes of a distributed computing system such as a datacenter, Big Data analytics, HPC system, super computer, and the like. The method includes adjusting (block 704), via a processor, the speeds of the parallel tasks based on imbalances between the respective speeds of the parallel tasks.

The adjustment (block 704) of the task speeds may be to increase performance of the job and/or to lower power consumption of the job, as noted in block 706. Indeed, as should be apparent with benefit of the present disclosure, the adjustment may result in an increase in performance or a reduction in power, or a combination of both an increase in performance and a reduction in power consumption of the distributed computing job.

In examples, the performance of the job may be measured as the time-to-completion of the job, and the respective speeds of the parallel tasks may be the respective time-to-completions of the parallel tasks. Moreover, to make such adjustments to increase performance or lower power, the adjustments may be predictive and/or reactive, as discussed above.

In certain embodiments, the speed of a task may be adjusted (block 704) by adjusting frequency of a processor core (of the compute node) on which the task is executing. Thus, the adjustments may generally affect power consumption of a processor core correlative with a voltage versus frequency relationship of the processor core, for example.

In some embodiments, the adjustment (block 704) may decrease (block 708) the speed of a faster task. Thus, the adjustment may lower power consumption of the job without decreasing the performance of the job, as noted in block 710. In other embodiments, the adjustment (block 704) may increase the speed of a slower task and decrease the speed of a faster task, as noted in block 712. Therefore, in particular examples, the adjustment may increase performance of the job without increasing power consumption of the job, as indicated in block 714.

In summary, an embodiment is a method of executing a job of distributed computing on compute nodes. The distributed computing may be high performance computing (HPC), and the job may be an HPC job or a Big Data analytics job, or both. Further, the compute nodes may be part of a system in a datacenter. The method includes adjusting, via a processor, the speed of parallel tasks of the job executing on the compute nodes to increase performance of the job or to lower power consumption of the job, or both, wherein the adjusting is based on imbalances of respective speeds of the parallel tasks. The performance may be the time-to-completion of the job. The respective speeds of the parallel tasks may be respective time-to-completions of the parallel tasks. In particular examples, the speed of parallel tasks may be adjusted by adjusting frequency of processor cores of the compute nodes at which the parallel tasks are executed. The method may include identifying predictively, via the processor, the speed of one or more of the parallel tasks. Further, the adjusting may include adjusting reactively the speed of one or more of the parallel tasks in response to completion of one of the parallel tasks.

Another embodiment is a distributed computing system having a processor or processors, and memory storing code executable by the processor. The code is executable by the processor to adjust speeds of parallel tasks of a job executing on compute nodes of a distributed computing system, wherein to adjust speeds of the parallel tasks is to increase performance of the job or to lower power consumption of the job, or both, and is based on imbalances among the speeds of the parallel tasks. The performance may be the time-to-completion of the job. Further, the compute nodes may include the aforementioned processor and the memory. The job may generally include hundreds or thousands of parallel tasks. For discussion, the parallel tasks may include at least a first task and a second task, the first task faster than the second task, and wherein to adjust includes to decrease speed of the first task to lower power consumption of the job without decreasing the performance of the job. On the other hand, the parallel tasks may include a first task and a second task, the first task slower than the second task, and wherein the to adjust includes to increase speed of the first task and to slow speed of the second task, to increase the performance of the job without an increase increasing the power consumption of the job. If so, the time-to-completion of the first task, as adjusted, may be approximately equal to time-to-completion of the second task, as adjusted. In a reactive adjustment example, the parallel tasks include a first task and a second task, the first task faster than the second task, and wherein the speed of the second task is increased after the first task completes and is waiting for synchronization. Lastly, the distributed computing may be high performance computing (HPC), and the job may be an HPC job.

Yet another embodiment is a non-transitory, computer-readable medium having instructions executable by a processor to adjust speed of parallel tasks of a distributed computing job based on speed imbalances between the parallel tasks, to increase performance of the distributed computing or to lower power consumption of the distributed computing job, or a combination thereof. The job may generally include hundreds or thousands of parallel tasks. For discussion, the parallel tasks may include at least a first task and a second task, the first task faster than the second task, and wherein to adjust includes to decrease speed of the first task to lower power consumption of the job without decreasing the performance of the job. On the other hand, the parallel tasks may include a first task and a second task, the first task slower than the second task, and wherein to adjust includes to increase speed of the first task and/or to slow speed of the second task, to increase the performance of the job without increasing the power consumption of the job. Lastly, the distributed computing job may be a high-performance computing (HPC) job and/or a Big Data analytics job.

Figure 8:
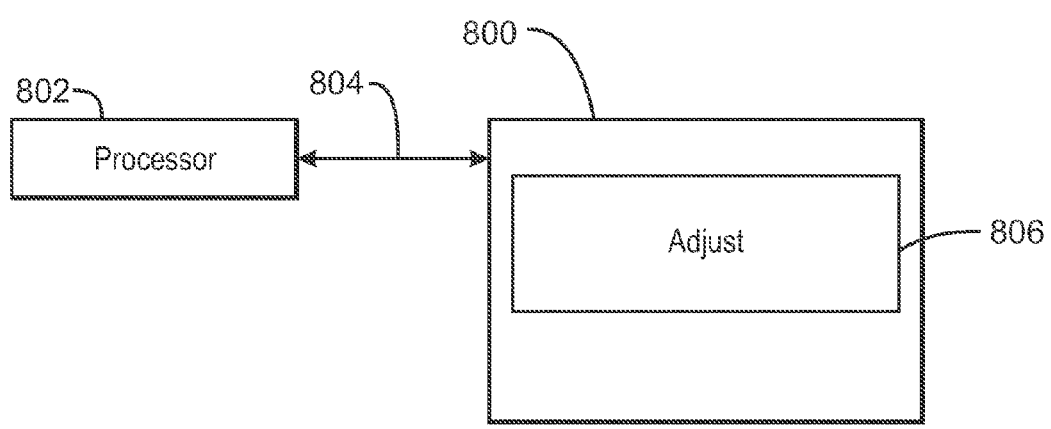
FIG. 8 is a block diagram depicting an example of a tangible non-transitory, computer-readable medium that can facilitate adjustment of tasks of a distributed computing job executing on compute nodes in accordance with embodiments of the present techniques.

FIG. 8 is a block diagram depicting an example of a tangible non-transitory, computer-readable medium 800 that can facilitate adjustment of tasks of a distributed computing job executing on compute nodes. The computer-readable medium 800 may be accessed by a processor 802 over a computer interconnect 804. The processor 802 may be one or more compute node processors (e.g., 103), a server processor (e.g., 103, 116), or another processor. The tangible, non-transitory, computer-readable medium 800 may include executable instructions or code to direct the processor 802 to perform the operations of the techniques described herein.

The various software components discussed herein may be stored on the tangible, non-transitory, computer-readable medium 800, as indicated in FIG. 8. For example, an adjustment module 806 (executable code/instructions) may direct the processor 802 to adjust speed of parallel tasks of a distributed computing job based on speed imbalances between the parallel tasks to increase performance of the distributed computing or to lower power consumption of the distributed computing job, or a combination thereof. Further, the adjustment may be reactive and/or predictive, involve a variety of actions such as identifying predictively various tasks, and so forth. The code or adjustment module 806 may be similar or the same as the aforementioned executable code 107, 120 in FIG. 1. It should be understood that any number of additional software components not shown in FIG. 8 may be included within the tangible, non-transitory, computer-readable medium 800, depending on the application.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is a distributed computing system having a processor, and memory storing code executable by the processor to adjust speed of parallel tasks of a job executing on compute nodes of a distributed computing system, to increase performance of the job or to lower power consumption of the job, or both. The adjustment is based on imbalances among the speeds of the parallel tasks.

Example 2 incorporates the subject matter of Example 1. In this example, the performance is or is measured as time-to-completion of the job.

Example 3 incorporates the subject matter of any combination of Examples 1-2. In this example, the respective speed of the parallel tasks is or is characterized by the respective time-to-completions of the parallel tasks.

Example 4 incorporates the subject matter of any combination of Examples 1-3. In this example, to adjust speed of parallel tasks includes adjusting frequency of processor cores of the compute nodes at which the parallel tasks are executed.

Example 5 incorporates the subject matter of any combination of Examples 1-4. In this example, the code is executable by the processor to identify predictively the speed of at least one of the parallel tasks.

Example 6 incorporates the subject matter of any combination of Examples 1-5. In this example, to adjust includes to adjust reactively the speed of one or more of the parallel tasks in response to completion of another parallel task.

Example 7 incorporates the subject matter of any combination of Examples 1-6. In this example, to adjust speed of the parallel tasks results in lower power consumption of the job.

Example 8 incorporates the subject matter of any combination of Examples 1-7. In this example, to adjust speed of the parallel tasks results in lower power consumption of the job without decreasing the performance of the job.

Example 9 incorporates the subject matter of any combination of Examples 1-8. In this example, the compute nodes include the processor and the memory.

Example 10 incorporates the subject matter of any combination of Examples 1-9. In this example, the parallel tasks include a first task and a second task, the first task faster than the second task, and wherein to adjust includes to decrease speed of the first task to lower power consumption of the job without decreasing the performance of the job.

Example 11 incorporates the subject matter of any combination of Examples 1-10. In this example, the parallel tasks include at least a first task and a second task, the first task slower than the second task, and wherein to adjust includes to increase speed of the first task and to slow speed of the second task, to increase the performance of the job without increasing the power consumption of the job.

Example 12 incorporates the subject matter of any combination of Examples 1-11. In this example, time-to-completion of the first task, as adjusted, is approximately equal to time-to-completion of the second task, as adjusted.

Example 13 incorporates the subject matter of any combination of Examples 1-12. In this example, speed of the first task, as adjusted, is approximately equal to speed of the second task, as adjusted.

Example 14 incorporates the subject matter of any combination of Examples 1-13. In this example, the speed comprises time-to-completion.

Example 15 incorporates the subject matter of any combination of Examples 1-14. In this example, the distributed computing is high performance computing (HPC), and the job is an HPC job or a Big Data analytics job, or both.

Example 16 incorporates the subject matter of any combination of Examples 1-15. In this example, the distributed computing is high performance computing (HPC), and the job is an HPC job, and wherein the compute nodes are part of a system of nodes in a datacenter.

Example 17 is a method of distributed computing, including executing a job of distributed computing on compute nodes. The method includes adjusting, via a processor, speed of parallel tasks of the job executing on the compute nodes to increase performance of the job or to lower power consumption of the job, or both, wherein the adjusting is based on imbalances of respective speeds of the parallel tasks.

Example 18 incorporates the subject matter of Example 17. In this example, the performance is or is measured by time-to-completion of the job, and the respective speed of the parallel tasks is or is characterized by respective time-to-completion of the parallel tasks.

Example 19 incorporates the subject matter of any combination of Examples 17-18. In this example, adjusting the speed of parallel tasks comprises adjusting frequency of processor cores of the compute nodes at which the parallel tasks are executed.

Example 20 incorporates the subject matter of any combination of Examples 17-19. This example includes identifying predictively, via the processor, the speed of one or more of the parallel tasks.

Example 21 incorporates the subject matter of any combination of Examples 17-20. In this example, the adjusting includes adjusting reactively the speed of one or more of the parallel tasks in response to completion another one of the parallel tasks.

Example 22 incorporates the subject matter of any combination of Examples 17-21. In this example, the adjusting results in lower power consumption of the job without decreasing the performance of the job.

Example 23 incorporates the subject matter of any combination of Examples 17-22. In this example, the parallel tasks include a first task and a second task, the first task faster than the second task, and wherein adjusting includes decreasing speed of the first task.

Example 24 incorporates the subject matter of any combination of Examples 17-23. In this example, the adjusting results in lower power consumption of the job without decreasing the performance of the job.

Example 25 incorporates the subject matter of any combination of Examples 17-24. This example includes identifying predictively, via the processor, the first task as faster than the second task.

Example 26 incorporates the subject matter of any combination of Examples 17-25. In this example, the adjusting results in increased performance of the job without an increase in the power consumption of the job.

Example 27 incorporates the subject matter of any combination of Examples 17-26. In this example, the parallel tasks include a first task and a second task, the first task slower than the second task, and wherein adjusting includes increasing speed of the first task and slowing speed of the second task.

Example 28 incorporates the subject matter of any combination of Examples 17-27. In this example, speed of the first task, as adjusted, is approximately equal to speed of the second task, as adjusted.

Example 29 incorporates the subject matter of any combination of Examples 17-28. In this example, the speed is or is characterized by time-to-completion.

Example 30 incorporates the subject matter of any combination of Examples 17-29. In this example, the adjusting results in increased performance of the job without an increase in the power consumption of the job.

Example 31 incorporates the subject matter of any combination of Examples 17-30. In this example, the compute nodes are in a system of compute nodes in a data center.

Example 32 incorporates the subject matter of any combination of Examples 17-31. In this example, the distributed computing is high performance computing (HPC), and the job is an HPC job or a Big Data analytics job, or both.

Example 33 incorporates the subject matter of any combination of Examples 17-32. In this example, the compute nodes are in a system in a datacenter.

Example 34 is a non-transitory, computer-readable medium having instructions executable by a processor to adjust speed of parallel tasks of a job of distributed computing executing on compute nodes, where to adjust is based on speed imbalances between the parallel tasks, and based on to (1) increase performance of the job or (2) lower power consumption of the job, or a combination thereof.

Example 35 incorporates the subject matter of Example 34. In this example, the parallel tasks include a first task and a second task, the first task faster than the second task, and wherein to adjust includes to decrease speed of the first task to lower power consumption of the job without decreasing the performance of the job.

Example 36 incorporates the subject matter of any combination of Examples 34-35. In this example, the parallel tasks include a first task and a second task, the first task slower than the second task, and wherein to adjust includes to increase speed of the first task and to slow speed of the second task, to increase the performance of the job without increasing the power consumption of the job.

Example 37 incorporates the subject matter of any combination of Examples 34-36. In this example, the job is a high-performance computing (HPC) job or a Big Data analytics job, or both.

Example 38 is an apparatus having means for adjusting speed of parallel tasks of a distributed computing job based on speed imbalances between the parallel tasks, to increase performance of the distributed computing or to lower power consumption of the distributed computing job, or a combination thereof.

Example 39 incorporates the subject matter of Example 38. In this example, the parallel tasks include a first task and a second task, the first task faster than the second task, and wherein the adjusting comprises to decrease speed of the first task to lower power consumption of the job without decreasing the performance of the job.

Example 40 incorporates the subject matter of Example 38. In this example, the parallel tasks include a first task and a second task, the first task slower than the second task, and wherein the adjusting includes to increase speed of the first task and to slow speed of the second task, to increase the performance of the job without increasing the power consumption of the job.

Example 41 incorporates the subject matter of any combination of Examples 38-40. In this example, the distributed computing job is a high-performance computing (HPC) job or a Big Data analytics job, or both.

Example 42 is a distributed computing system including a processor. The distributed computing system has memory storing code executable by the processor to adjust speed of parallel tasks of a job of distributed computing executing on compute nodes of a system of nodes, wherein to adjust speeds of the parallel tasks is based on imbalances among the speeds of the parallel tasks, and is to increase performance of the job or to lower power consumption of the job, or both, and is.

Example 43 incorporates the subject matter of Example 42. In the example, the code is executable by the processor to identify predictively the speed of at least one of the parallel tasks, and wherein to adjust speed of parallel tasks includes adjusting frequency of processor cores of the compute nodes at which the parallel tasks are executed.

Example 44 incorporates the subject matter of any combination of Examples 42-43. In this example, to adjust includes to adjust reactively the speed of one or more of the parallel tasks in response to completion of another one of the parallel tasks.

Example 45 incorporates the subject matter of any combination of Examples 42-44. In this example, the distributed computing includes high performance computing (HPC), and the job is an HPC job or a Big Data analytics job, or both, and wherein the compute nodes include the processor and the memory.

Example 46 incorporates the subject matter of any combination of Examples 42-45. In this example, the parallel tasks include a first task and a second task, the first task faster than the second task, and wherein to adjust includes to decrease speed of the first task to lower power consumption of the job without decreasing the performance of the job.

Example 47 incorporates the subject matter of any combination of Examples 42-45. In this example, the parallel tasks include a first task and a second task, the first task slower than the second task, and wherein to adjust includes to increase speed of the first task and to slow speed of the second task, to increase the performance of the job without an increasing the power consumption of the job.

Example 48 is a distributed computing facility having means for executing a job of distributed computing. The facility has means for adjusting speed of parallel tasks of the job as executed to increase performance of the job or to lower power consumption of the job, or both, wherein the adjusting is based on imbalances of respective speeds of the parallel tasks.

Example 49 incorporates the subject matter of Example 48. In this example, adjusting the speed of parallel tasks includes adjusting an operating variable of the means for executing.

Example 50 incorporates the subject matter of any combination of Examples 48-49. In this example, the distributed computing facility is a datacenter.

Example 51 incorporates the subject matter of any combination of Examples 48-50. In this example, the means for executing are part of a system of distributed computing.

Example 52 incorporates the subject matter of any combination of Examples 48-51. This example includes means for identifying predictively the speed of one or more of the parallel tasks.

Example 53 incorporates the subject matter of any combination of Examples 48-52. In this example, the distributed computing is high performance computing (HPC), and the job is an HPC job or a Big Data analytics job, or both.

Example 54 incorporates the subject matter of any combination of Examples 48-53. In this example, adjusting includes adjusting reactively the speed of one or more of the parallel tasks in response to completion another one of the parallel tasks.

Example 55 incorporates the subject matter of any combination of Examples 48-54. In this example, the parallel tasks include a first task and a second task, the first task faster than the second task, and wherein adjusting includes decreasing speed of the first task to lower power consumption of the job without decreasing the performance of the job.

Example 56 incorporates the subject matter of any combination of Examples 48-54. In this example, the parallel tasks include a first task and a second task, the first task slower than the second task, and wherein adjusting includes increasing speed of the first task and slowing speed of the second task to increased performance of the job without an increase in the power consumption of the job.

Example 57 is a non-transitory, computer-readable medium having instructions executable by a processor to adjust speed of parallel tasks of a distributed computing job based on speed imbalances between the parallel tasks, to increase performance of the distributed computing or to lower power consumption of the distributed computing job, or a combination thereof.

Example 58 incorporates the subject matter of Example 57. In this example, the parallel tasks include a first task and a second task, the first task faster than the second task, and wherein to adjust includes to decrease speed of the first task to lower power consumption of the distributed computing job without decreasing the performance of the distributed job.

Example 59 incorporates the subject matter of Example 57. In this example, the parallel tasks include a first task and a second task, the first task slower than the second task, and wherein to adjust includes to increase speed of the first task and to slow speed of the second task, to increase the performance of the distributed computing job without increasing the power consumption of the distributed computing job.

Example 60 incorporates the subject matter of any combination of Examples 57-59. In this example, the distributed computing job is a high-performance computing (HPC) job or a Big Data analytics job, or both.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A distributed computing system comprising:
  a processor; and
  memory storing code executable by the processor to adjust frequency of compute nodes to adjust speed of parallel tasks of a job executing on compute nodes of the distributed computing system,
  wherein increased speed of a parallel task shortens execution and time-to-completion of the parallel task,
  wherein to adjust frequency is not equal among the compute nodes,
  wherein to adjust speed of parallel tasks is with respect to a common synchronization point in time of the parallel tasks, is to increase performance of the job or to lower power consumption of the job, or both, and is based on imbalances among speeds of the parallel tasks, wherein to lower power consumption of the job comprises to lower frequency, and wherein to increase performance of the job comprises to move the common synchronization point to earlier in time to decrease time-to-completion of the job directed at least by a parallel task that synchronizes last arriving last among the parallel tasks at the common synchronization point.

2. The system of claim 1, wherein the job executes continuously on the compute nodes until completion, wherein to adjust frequency of compute nodes comprises adjusting operating frequency of processor cores of the compute nodes, and wherein the distributed computing comprises high performance computing (HPC), and the job comprises an HPC job or a Big Data analytics job, or both.

3. The system of claim 1, wherein the code is executable by the processor to identify predictively the speed of a parallel task executing on a compute node, wherein to identify predictively employs heuristics based on past and current performance of the compute node, or heuristics based on the compute node memory activity including quantity of accesses and instructions, or a combination thereof, wherein in response to predicting the parallel task will synchronize first of the parallel tasks in that the parallel task will be first among the parallel tasks to arrive at the common synchronization point, to adjust comprises reactively to lower the frequency of the compute node to decrease speed of the parallel task to lower power consumption of the job without decreasing performance of the job.

4. The system of claim 1, wherein to adjust comprises to increase reactively the frequency of one or more compute nodes to increase the speed of one or more the parallel tasks, in response to completion of another one of the parallel tasks, to move the common synchronization point to earlier in time to increase the performance of the job and without increasing the power consumption of the job, wherein the increase in speed of the one or more parallel tasks is correlative with a reduction in power consumption associated with the another one of the parallel tasks completing.

5. The system of claim 1, wherein the parallel tasks of the job comprise a first task executing on a first compute node and a second task executing on a second compute node, the first task faster than the second task, wherein to adjust comprises to lower frequency of the first compute node to decrease speed of the first task to lower power consumption of the job without decreasing the performance of the job, comprising not to move the common synchronization point to a later time, and wherein the imbalances are at least due to differences in computation between the parallel tasks and to manufacturing variations of the compute nodes.

6. The system of claim 1, wherein the parallel tasks of the job comprise a first task executing on a first compute node and a second task executing on a second compute node, the first task slower than the second task, wherein to adjust comprises to increase frequency of the first compute node to increase speed of the first task to move the common synchronization point to earlier in time, and to lower frequency of the second compute node to slow speed of the second task, to increase the performance of the job without increasing the power consumption of the job, and wherein the imbalances are at least due to differences in computation between the parallel tasks or at least due to manufacturing variations of the compute nodes, or at least due to both.

7. The system of claim 1, wherein the code is executable by the processor to identify predictively the speed of a first parallel task executing on a first compute node, wherein to identify predictively employs heuristics based on past and current performance of the compute node, or based on the compute node memory activity including quantity of accesses and instructions, or a combination thereof, wherein in response to predicting the first parallel task will synchronize last of the parallel tasks in that the first parallel task will arrive last, among the parallel tasks, at the common synchronization point, to adjust comprises reactively to increase frequency of the first compute node to increase speed of the first parallel task to move the common synchronization point to earlier in time to increase performance of the job, and to lower frequency of a second compute node to decrease speed of a second parallel task executing on the second compute node, wherein the power consumption of the job is not increased.

8. The system of claim 4, wherein the code is executable by the processor to calculate the reduction in power consumption associated with the completion of the another one of the parallel tasks, wherein the speed of one or more of the parallel tasks is increased such that an increase in power consumption associated with the increase in speed of the one or more parallel tasks is less than or equal to magnitude of the calculated reduction in power consumption.

9. The system of claim 4, wherein the another one of the parallel tasks completes executing on a first compute node, wherein the one or more parallel tasks comprises a second parallel task executing on a second compute node and a third parallel task executing on a third compute node, wherein increasing reactively the frequency comprises increasing frequency of the second compute node to increase speed of the second parallel task and increasing frequency of the third compute node to increase speed of the third parallel task, and wherein the increase in speed of the second parallel task is greater than the increase in speed of the third parallel task in response to predicting the second parallel task is slower than the third parallel task.

10. The system of claim 4, wherein the one or more parallel tasks comprise multiple parallel tasks, wherein the code is executable by the processor to employ a heuristic to rank-order respective speed of the multiple parallel tasks, and wherein the increase in speed in the one or more parallel tasks is based at least in part on the rank-order.

11. A method of distributed computing, comprising:
executing a job of distributed computing on compute nodes; and
adjusting, via a processor, frequency of compute nodes to adjust speed of parallel tasks of the job executing on the compute nodes to increase performance of the job or to lower power consumption of the job, or both,
wherein the adjusting is with respect to a common synchronization point in time of the parallel tasks, the adjusting is based on imbalances of respective speeds of the parallel tasks, and the adjusting is not equal among the compute nodes or among the parallel tasks,
wherein lowering power consumption of the job comprises lowering frequency,
wherein to increase performance of the job comprises moving the common synchronization point to earlier in time,
wherein increased speed of a parallel task shortens execution and time-to-completion of the parallel task,
wherein decreased speed increases time-to-completion, and
wherein to increase performance comprises to decrease time-to-completion of the job directed at least by a parallel task that synchronizes last arriving last among the parallel tasks at the common synchronization point.

12. The method of claim 11, wherein the performance comprises time-to-completion of the job, wherein the respective speed of the parallel tasks comprise respective time-to-completion of the parallel tasks, wherein adjusting frequency of the compute nodes comprises adjusting operating frequency of processor cores of the compute nodes, wherein to lower frequency of a compute node extends execution time of a parallel task executing on the compute node, and wherein to raise frequency of the compute node shortens execution time to completion of the parallel task executing on the compute node.

13. The method of claim 11, comprising identifying predictively, via the processor, the speed of a parallel task executing on a compute node, wherein identifying predictively employs heuristics based on past and current performance of the compute node, or heuristics based on the compute node memory activity including quantity of accesses and instructions, or a combination thereof, wherein in response to predicting the parallel task will synchronize first of the parallel tasks in that the parallel task will arrive first, among the parallel tasks, at the common synchronization point, the adjusting comprises reactively lowering the frequency of the compute node extending execution time of the parallel task to decrease speed of the parallel task to lower power consumption of the job without decreasing performance of the job, comprising not moving the common synchronization point to a later time.

14. The method of claim 11, wherein adjusting comprises increasing reactively the frequency of one or more compute nodes to increase the speed of one or more of the parallel tasks in response to completion another one of the parallel tasks, to move the common synchronization point to earlier in time to increase the performance of the job and without increasing the power consumption of the job, comprising calculating, via the processor, a reduction in power consumption associated with completion of the another one of the parallel tasks, wherein an increase in power consumption associated with the increase in speed of the one or more parallel tasks is less than or equal to magnitude of the calculated reduction in power consumption.

15. The method of claim 11, wherein the parallel tasks comprise a first task executing on a first compute node and a second task executing on a second compute node, the first task faster than the second task, and wherein adjusting comprises lowering frequency of the first computer node extending execution time of the first task and thus decreasing speed of the first task to lower power consumption of the job without decreasing the performance of the job, comprising not moving the common synchronization point to a later time.

16. The method of claim 15, comprising identifying predictively, via the processor, the first task as faster than the second task, and wherein the imbalances are at least due to differences in computation between the parallel tasks or at least due to manufacturing variations of the compute nodes, or at least due to both.

17. The method of claim 11, wherein the parallel tasks comprise a first task executing on a first compute node and a second task executing on a second compute node, the first task slower than the second task, and wherein adjusting comprises increasing frequency of the first compute node reducing execution time of the first task and thus increasing speed of the first task to move the common synchronization point to earlier in time, and decreasing frequency of the second computer node extending execution time of the second task and thus slowing speed of the second task, to increase performance of the job without an increase in the power consumption of the job.

18. The method of claim 11, comprising executing the job continuously on the compute nodes from start of the job until completion of the job, wherein the distributed computing comprises high performance computing (HPC), and the job comprises an HPC job or a Big Data analytics job, or both, and wherein the compute nodes are part of a system of nodes in a datacenter.

19. The method of claim 11, comprising identifying predictively, via the processor, speed of a first parallel task executing on a first compute node and speed of a second parallel task executing on a second computer node, wherein identifying predictively employs heuristics based on past and current performance of the first compute node and the second compute node, or heuristics based on the first compute node memory activity and the second node memory activity, or a combination thereof, wherein in response to predicting that the first parallel task will synchronize last of the parallel tasks in that the first parallel task will arrive last, among the parallel tasks, at the common synchronization point, the adjusting comprises reactively increasing frequency of the first compute node to increase speed of the first parallel task to move the common synchronization point to earlier in time to increase performance of the job, and lowering frequency of the second compute node to decrease speed of the second parallel task, wherein the power consumption of the job is not increased.

20. The method of claim 14, wherein the another one of the parallel tasks completes executing on a first compute node, wherein the one or more parallel tasks comprises a second parallel task executing on a second compute node and a third parallel task executing on a third compute node, wherein increasing reactively the frequency comprises increasing frequency of the second compute node to increase speed of the second parallel task and increasing frequency of the third compute node to increase speed of the third parallel task, and wherein the increase in speed of the second parallel task is greater than the increase in speed of the third parallel task in response to predicting the second parallel task is slower than the third parallel task.

21. A non-transitory, computer-readable medium comprising instructions executable by a processor to adjust frequency of compute nodes to adjust speed of parallel tasks of a distributed computing job with respect to a common synchronization point in time of the parallel tasks and based on speed imbalances between the parallel tasks, to increase performance of the distributed computing job or to lower power consumption of the distributed computing job, or a combination thereof,
  wherein to adjust is not equal among the parallel tasks,
  wherein to increase performance of the distributed computing job comprises to move the common synchronization point to earlier in time, and
  wherein to lower power consumption comprises to lower frequency so to perform a same computation at lower power,
  wherein increased speed of a parallel task shortens execution and time-to-completion of the parallel task,
  wherein decreased speed increases time-to-completion, and
  wherein to increase performance comprises to decrease time-to-completion of the job directed at least by a parallel task that synchronizes last arriving last among the parallel tasks at the common synchronization point.

22. The non-transitory, computer-readable medium of claim 21, wherein the distributed computing job to execute continuously on the compute nodes until completion, wherein the parallel tasks comprise a first task executing on a first compute node and a second task executing on a second compute node, the first task faster than the second task, and wherein to adjust comprises to decrease frequency of the first compute node to decrease speed of the first task extending execution time to completion of the first task and to lower power consumption of the distributed computing job without decreasing the performance of the distributed computing job, comprising to not move the common synchronization point to later in time.

23. The non-transitory, computer-readable medium of claim 21, wherein the parallel tasks comprise a first task executing on a first compute node and a second task executing on a second compute node, the first task slower than the second task, and wherein to adjust comprises to increase frequency of the first compute node to increase speed of the first task to move the common synchronization point to earlier in time and to decrease frequency of the second compute node to slow speed of the second task, to increase the performance of the distributed computing job without increasing power consumption of the distributed computing job, and wherein the imbalances are at least due to differences in computation between the parallel tasks or at least due to manufacturing variations of the compute nodes, or at least due to both.

24. The non-transitory, computer-readable medium of claim 21, wherein the instructions executable by the processor to identify predictively the speed of a parallel task executing on a compute node, wherein to identify predictively employs heuristics based on past and current performance of the compute node, or based on the compute node memory activity including quantity of accesses and instructions, or a combination thereof, and wherein to adjust comprises reactively to lower the frequency of the compute node to decrease speed of the parallel task to lower power consumption of the distributed computing job without decreasing performance of the distributed computing job, in response to predicting the parallel task will synchronize first of the parallel tasks in that the parallel task will be first among the parallel tasks to arrive at the common synchronization point.

25. The non-transitory, computer-readable medium of claim 21, wherein the instructions executable by the processor to identify predictively the speed of a parallel task executing on a compute node, wherein to identify predictively employs heuristics based on past and current performance of the compute node, or based on the compute node memory activity including quantity of accesses and instructions, or a combination thereof, and wherein to adjust comprises reactively to increase frequency of the compute node to increase speed of the parallel task to move the common synchronization point to earlier in time to increase performance of the distributed computing job, and to lower frequency of a second compute node to decrease speed of a second parallel task executing on the second compute node such that the power consumption of the distributed computing job is not increased.

* * * * *